US006464192B1

(12) United States Patent
Gibbs, Jr.

(10) Patent No.: US 6,464,192 B1
(45) Date of Patent: Oct. 15, 2002

(54) VEHICLE SUPPORT FOR USE WITH JACK

(76) Inventor: William E. Gibbs, Jr., 18113 Hummingbird Dr., Tinley Park, IL (US) 60477

(*) Notice: Subject to any disclaimer, the term of this patent is extended or adjusted under 35 U.S.C. 154(b) by 0 days.

(21) Appl. No.: 09/723,043

(22) Filed: Nov. 27, 2000

(51) Int. Cl.[7] ........................ F16M 13/00; E04G 25/00; B66F 3/24

(52) U.S. Cl. ...................... 248/352; 248/354.1; 254/88; 254/93 H

(58) Field of Search ................................ 248/352, 678, 248/346.01, 346.5, 351, 354.1, 354.3, 354.5, 354.6, 188.1, 188.2, 188.5; 254/88, 93 H; 108/147

(56) References Cited

U.S. PATENT DOCUMENTS

| | | | | | |
|---|---|---|---|---|---|
| 1,179,623 A | | 4/1916 | Gerrish | |
| 2,524,955 A | | 10/1950 | Borzell et al. | 248/163 |
| 3,295,829 A | | 1/1967 | Tarr | 254/88 |
| 3,606,253 A | | 9/1971 | Wooten et al. | 254/88 |
| 3,638,910 A | * | 2/1972 | Nellis et al. | 254/88 |
| 3,870,277 A | | 3/1975 | West | 254/88 |
| 4,009,855 A | | 3/1977 | Hoffmann et al. | 248/352 |
| 4,108,421 A | | 8/1978 | Extine | 254/88 |
| 4,684,097 A | | 8/1987 | Cox | 248/354 |
| 4,690,361 A | | 9/1987 | Lundman | 248/352 |
| 4,723,756 A | * | 2/1988 | Stumpc, Jr. | 254/93 H |
| 4,744,712 A | * | 5/1988 | Mitchell | 414/217 |
| 5,193,784 A | * | 3/1993 | Obernberger | 254/1 |
| 5,437,236 A | * | 8/1995 | Zeiner | 108/147 |
| 5,520,360 A | * | 5/1996 | Wensman | 248/354.5 |
| 5,855,359 A | * | 1/1999 | Chipperfield | 254/88 |
| 5,901,935 A | * | 5/1999 | Lai | 248/354.1 |
| 6,019,337 A | * | 2/2000 | Brown | 248/354.5 |
| 6,158,552 A | * | 12/2000 | Gould et al. | 182/200 |

* cited by examiner

*Primary Examiner*—Anita King
(74) *Attorney, Agent, or Firm*—Emrich & Dithmar

(57) ABSTRACT

A vehicle support apparatus includes lower and upper parallel plates connected by plural telescoping vertical supports. The upper plate is adapted to receive an elevated vehicle wheel and provide support therefor. Locking pins are spring-biased to a locked position wherein each pin is inserted in one of plural pairs of aligned apertures disposed in a spaced manner in a telescoping vertical support to maintain the telescoping members in fixed relative position. The vehicle is first lifted by a jack and the apparatus positioned so as to place one of the vehicle's wheels on the upper plate to support the vehicle. The jack is then removed from the vehicle, placed between the spaced, parallel lower and upper plates, and the upper plate and vehicle wheel are further raised using the jack, with the telescoping vertical support locked at the desired height either manually or automatically by the locking pins.

20 Claims, 4 Drawing Sheets

VEHICLE SUPPORT FOR USE WITH JACK

FIELD OF THE INVENTION

This invention relates generally to apparatus for supporting a vehicle in an elevated position and is particularly directed to a vehicle support used in conjunction with a jack for engaging and supporting a wheel of the vehicle in an elevated position for performing maintenance or repairs on the vehicle.

BACKGROUND OF THE INVENTION

Jacks for lifting a vehicle come in various forms, with the conventional mechanical, ratchet-type jack and the hydraulic jack being the most common. The lifting element of the jack is typically placed beneath and engages a structural member of the vehicle's undercarriage, such as its axle or a frame member. A jack is typically used for minor maintenance or repair which can be accomplished in a relatively short period. For more extensive maintenance/repairs requiring the mechanic to be positioned beneath the vehicle, other support structures are typically employed of a stronger, more permanent nature than a jack. Perhaps the most common of these latter type of vehicle support structures is the jack stand. As in the case of the jack itself, a jack stand is placed beneath and engages a structural member of the vehicle's undercarriage. By engaging and supporting the vehicle by means of its undercarriage, these types of vehicle support devices restrict access to the lower portion of the vehicle. If the component of the vehicle's undercarriage is large, the use of this type of undercarriage support device may require repositioning of the support device during the maintenance/repair, thus complicating and extending the time required for the maintenance/repair. In addition, this type of vehicle support device also requires the worker to position the device beneath the vehicle while the vehicle is supported by a jack. This increases the risk to the worker because of the possibility of jack failure.

The present invention addresses the aforementioned limitations of the prior art by providing a stable, high strength, adjustable-height support device for a vehicle which is used in conjunction with a jack for safely elevating and supporting a vehicle for maintenance or repair. The vehicle is first lifted by the jack and one of its tires is positioned on the vehicle support device. The jack is then removed from the vehicle, placed in engagement with the inventive support device and the vehicle is further elevated by the jack as it is supported by the device. The device is then locked in position, either manually of automatically, to stable and securely support the vehicle, with the jack then removed.

OBJECTS AND SUMMARY OF THE INVENTION

Accordingly, it is an object of the present invention to support a vehicle in a stable, secure manner while allowing for unrestricted access to the underside of the vehicle for maintenance or repair.

It is another object of the present invention to provide a vehicle support which is adapted for use with a jack to provide stable support for the vehicle for maintenance or repair over a wide range of heights.

Yet another object of the present invention is to provide a vehicle support for engaging and supporting a wheel of a vehicle which is self-locking, stable and of high strength, and which is easily raised or lowered using a conventional jack.

The present invention contemplates a multi-position vehicle support apparatus comprising a lower platform disposed on a support surface such as the ground or a floor; plural extendible support members attached to and extending upward from the lower platform in a generally vertical manner; an upper platform disposed above the lower platform and attached to respective upper end portions of the plural extendible support members, the upper platform adapted to receive a wheel of a vehicle for supporting the vehicle in a first upraised position, the upper platform including a lower portion adapted to receive a jack for raising the upper platform and the wheel disposed thereon to a second, higher upraised position; and plural locking mechanisms each coupled to a respective extendible support member for locking the extendible support members in fixed relative position for supporting the vehicle at the second, higher upraised position.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
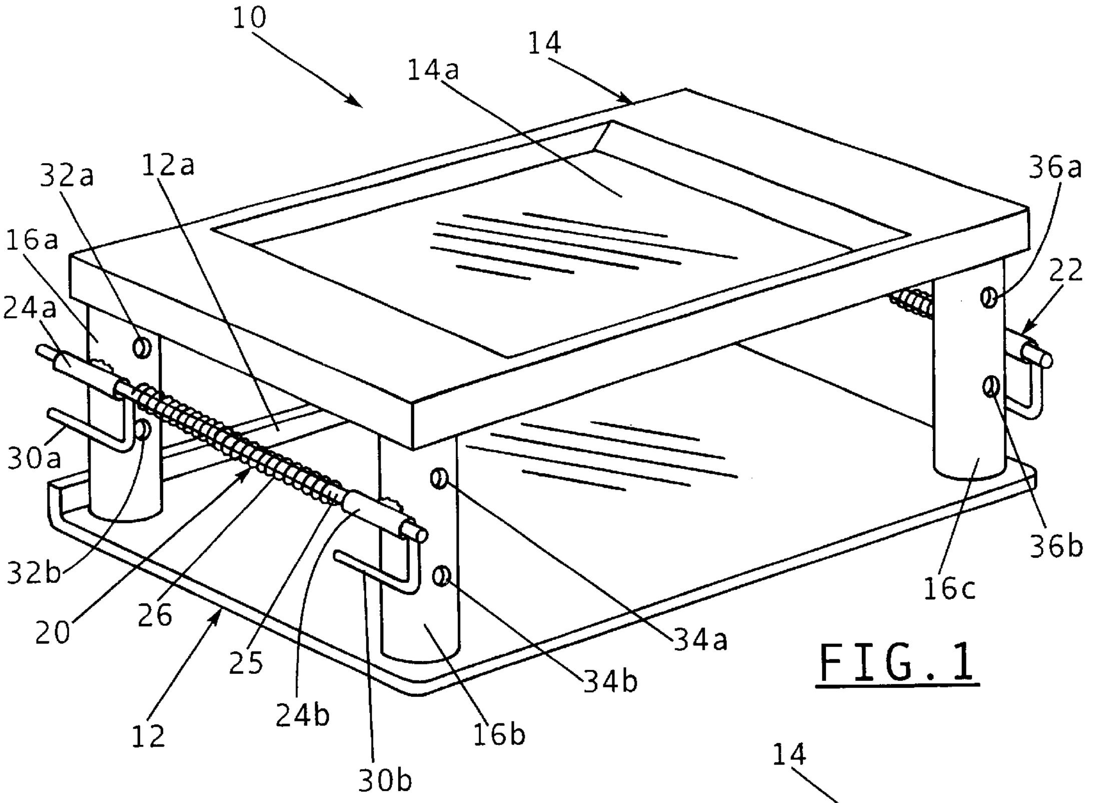
FIG. 1 is an upper perspective view of a vehicle support in accordance with the principles of the present invention.
Figure 2:
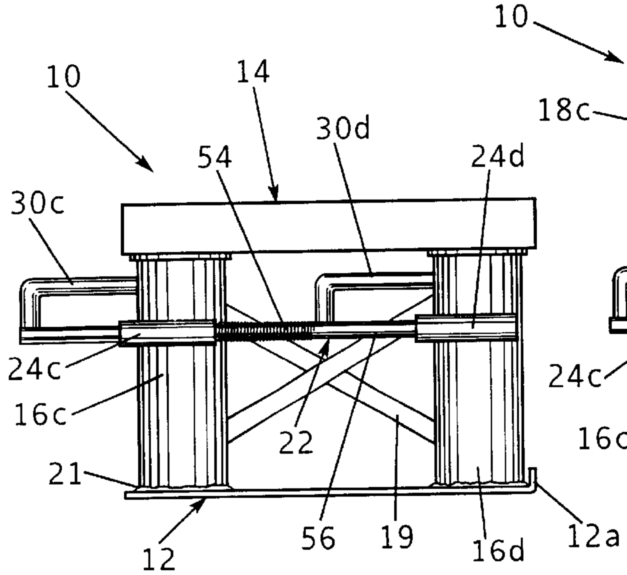
FIGS. 2 and 3 are end-on views of the vehicle support of FIG. 1, respectively illustrating the vehicle support in the lowered and upraised positions.
Figure 3:
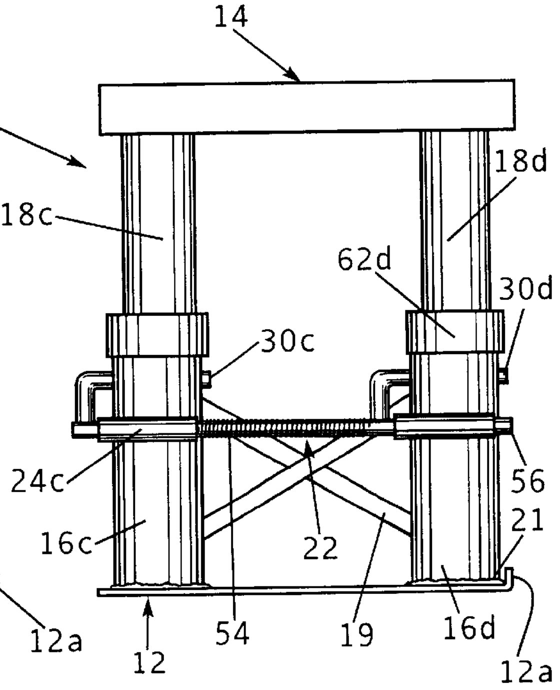

Referring to FIG. 1, there is shown an upper perspective view of a vehicle support 10 in accordance with the principles of the present invention. End-on views of the vehicle support 10 are shown in FIGS. 2 and 3, where the vehicle support is respectively shown in a lowered position and an upraised position.

Vehicle support 10 includes lower and upper platforms 12 and 14, each of which is generally rectangular and planar in shape. Attached to the upper surface of the lower platform 12 are first, second, third, and fourth vertical supports 16*a*, 16*b*, 16*c* and 16*d*. The lower ends of each of the first through fourth vertical supports 16*a*–16*d* are securely attached to the upper surface of the lower platform 12 by conventional means such as weldments 21 as shown in FIGS. 2 and 3. Each of the first through fourth vertical supports 16*a*–16*d* is generally cylindrical in shape and is open at the top. A pair of cross braces 19 are attached to and extend between the first and second vertical supports 16*a*, 16*b* and between the third and fourth vertical supports 16*c*, 16*d* as shown in FIGS. 2 and 3. Cross braces have been omitted from the other figures for simplicity. The cross braces 19 substantially increase the strength of the vehicle support 10. Inserted within the first through fourth vertical supports 16*a*–16*d* in a telescoping manner are fifth through eighth vertical supports 18*a*, 18*b*, 18*c*, and 18*d*. Each of the fifth through eighth vertical supports 18*a*–18*d* is freely slidable within its associated first through fourth vertical supports 16*a*–16*d* to permit the upper platform 14 to be raised from the lowered positioned shown in FIG. 2 to the upraised position shown in FIG. 3.

Figure 4:
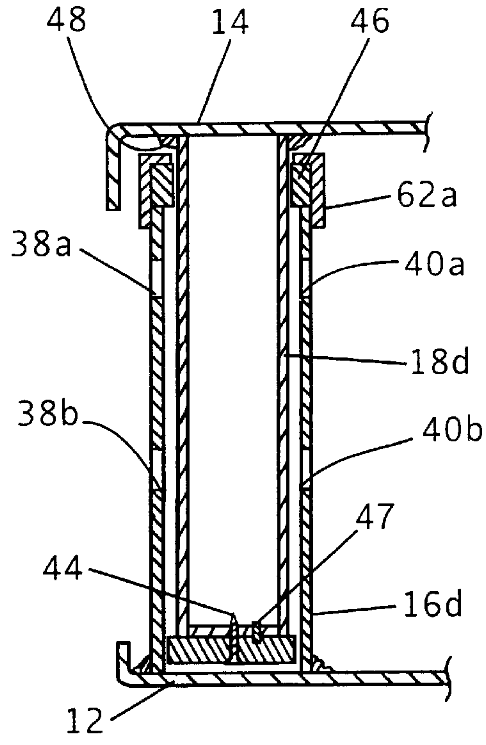
FIG. 4 is a vertical sectional view of a portion of the vehicle support of the present invention shown in the lowered position.
Figure 5:
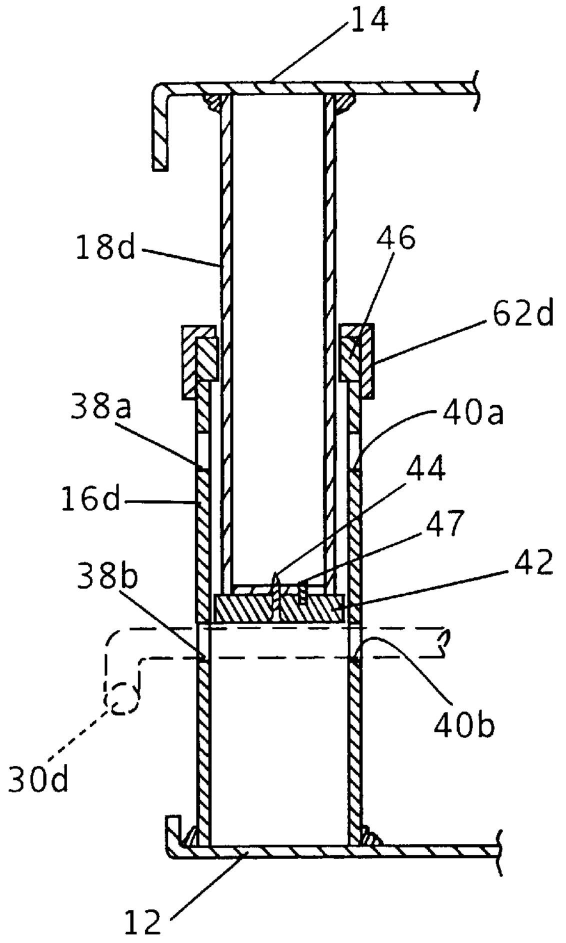
FIG. 5 is a vertical sectional view of a portion of the vehicle support of the present invention shown in an upraised, locked position.

Sectional views of the combination of the fourth and eighth vertical supports 16*d* and 18*d* are shown in FIGS. 4 and 5, with the lowered position shown in FIG. 4 and the upraised, or extended, position shown in FIG. 5. The upper end of each of the fifth through eighth vertical supports 18*a*–18*d* is securely affixed to a lower surface of the upper platform 14 by conventional means such as weldments 48 as shown in the sectional views of FIGS. 4 and 5. Disposed on a lateral edge of the lower platform 12 and extending the length thereof is a reinforcing flange, or rib, 12*a*. Reinforcing flange 12*a* increases the bending strength of the lower platform 12. Reinforcing flange 12*a* may be eliminated in those cases where the size of the jack with which the vehicle support 10 is used requires that the jack extend entirely through the vehicle support. The upper platform 14 includes reinforcing flanges 14*b* and 14*c* disposed on opposed lateral edges and extending the length of the upper platform. The cross braces discussed above attached to adjacent vertical supports increase the strength of the vehicle support 10 and allow it to accommodate large vehicle weights without lateral bending or other deformation. Each of the pairs of cross braces is attached to an associated pair of vertical supports by conventional means such as weldments which are not shown in the figures for simplicity. The lower and upper platforms 12, 14, the first through fourth vertical supports 16*a*–16*d*, the fifth through eighth vertical support 18*a*–18*d*, and the first and second pairs of cross braces 19 are all preferably comprised of a high strength metal such as steel. Other components of the vehicle support 10 described in the following paragraphs are also preferably comprised of a high strength metal such as steel.

Attached to outer lateral portions of the first and second vertical supports 16*a*, 16*b* is a first locking mechanism 20. Similarly, attached to outer, lateral portions of the third and fourth vertical supports 16*c*, 16*d* is a second locking mechanism 22. The first locking mechanism 20 includes first and second generally cylindrical brackets 24*a* and 24*b* respectively attached to outer lateral portions of the first and second vertical supports 16*a* and 16*b* by conventional means such as weldments. The first and second cylindrical brackets 24*a*, 24*b* are aligned along a common axis and each is provided with an aperture extending the length of the bracket. Similarly, third and fourth cylindrical brackets 24*c* and 24*d* are respectively attached to outer lateral portions of the third and fourth vertical supports 16*c* and 16*d* as shown in FIGS. 2 and 3. The third and fourth cylindrical brackets 24*c* and 24*d* are also cylindrical in shape, are aligned along a common axis, and each has a respective aperture extending the length thereof. Inserted through the aligned first and second cylindrical brackets 24*a*, 24*b* is a first elongated, linear rod 25. Similarly, inserted through the aligned third and fourth cylindrical brackets 24*c*, 24*d* is a second elongated, linear rod 56. Each of the first and second rods 25, 56 is slidably disposed within its associated, aligned pair of apertured cylindrical brackets. Attached in a spaced manner to the first rod 25 are first and second locking bars 30*a* and 30*b*. Similarly, attached in a spaced manner along the length of the second rod 56 are third and fourth locking bars 30*c* and 30*d*. Each of the aforementioned locking bars is securely attached to its associated rod and is generally "L" shaped. Disposed about and extending a portion of the length of the first rod 25 is a first coiled spring 26. The first coiled spring 26 is disposed about the first rod 25 and between the second cylindrical bracket 24*b* and the first locking bar 30*a*. The first coiled spring 26 is disposed about the first rod 25 in a compressed manner so as to urge the first rod 25 including the pair of locking bars attached thereto in a leftward direction as viewed in FIG. 1. Similarly, the second coiled spring 54 disposed about the second rod 56 is positioned between and engages the third cylindrical bracket 24*c* and the fourth locking bar 30*d* as shown in FIGS. 2 and 3. The compressed second coiled spring 54 urges the combination of the second rod 56 and third and fourth locking bars 30*c*, 30*d* in a rightward direction as viewed in FIGS. 2 and 3 for locking the vehicle support 10 in an upraised position as shown in FIG. 3 and is described in detail in the following paragraphs.

Disposed in a spaced manner along each of the first through fourth vertical supports 16*a*–16*d* are plural pairs of spaced apertures. Thus, the first vertical support 16*a* includes upper and lower paired apertures 32*a* and 32*b*, although only one of each of the paired apertures is shown in the figures for simplicity. The second and third vertical supports 16*b*, 16*c* similarly include respective pairs of aligned upper and lower apertures 34*a*, 34*b* and 36*a*, 36*b*, respectively. Finally, the fourth vertical support 16*d* includes a pair of upper aligned apertures 38*a* and 40*a* and a pair of lower aligned apertures 38*b* and 40*b* arranged in a spaced manner along the length of the vertical support as shown in FIGS. 4 and 5. As shown in its FIG. 4, in the lowered position the eighth vertical support 18*d* is fully inserted along its entire length within the fourth vertical support 16*d*. When the combination of the upper platform 14 and the four vertical supports attached thereto, including the eighth vertical support 18*d* as shown in FIGS. 4 and 5, is raised as described below, the fourth locking bar 30*d* (as shown in dotted line form in FIG. 5) is inserted through aligned apertures 38*b* and 40*b* for engaging an end cap 42 disposed on the lower end of the fourth vertical support 18*d* for maintaining the vertical support as well as the upper platform 14 in an upraised position as shown in FIG. 5. The first, second and third locking bars 30*a*–30*c* are similarly inserted through respective aligned apertures in the first through third vertical supports 16*a*–16*c* for maintaining each of these vertical supports as well as the upper platform 14 in an upraised position as shown in FIGS. 3 and 5. Further lifting of the upper platform 14 and the vertical supports attached thereto to a position above upper aligned apertures in each of the first through fourth vertical supports 16*a*–16*d* is followed by insertion of a respective locking bar in a pair of upper aligned apertures in each of these vertical supports permits the upper platform 14 to be supported at a second, higher level. Thus, with specific reference to FIGS. 4 and 5, the fourth locking bar 30*d* could also be inserted in the upper pair of aligned apertures 38*a* and 40*a* with the end cap 42 positioned above these aligned apertures so as to provide support for the fourth vertical support 18*d* and the upper platform 14 attached to an upper end thereof at a second, higher level. Although each of the first through fourth vertical supports 16*a*–16*d* is shown with two pairs of aligned apertures disposed in a spaced manner along its length, these vertical supports could be provided with a larger number of aligned apertures to provide smaller spacing between the elevated positions of the vehicle support or an increased elevation of the vehicle support's upper platform 14.

Disposed adjacent the opening in the upper end of the fourth vertical support 16*d* is a annular bearing 46 disposed between and engaging the fourth and eighth vertical supports 16*d* and 18*d* for facilitating sliding displacement between the two vertical supports. Annular bearing 46 may be comprised of any of the more conventional bearing materials and have a conventional bearing configuration. For example, annular bearing 46 may be either a nylon bearing or a ball bearing. Annular bearing 46 is maintained in position within the fourth vertical support 16*d* by means of a cylindrical collar 62*d* attached to the open upper end of the fourth vertical support. Similarly, end cap 42 is preferably comprised of a bearing material such as nylon for engaging the inner wall of the fourth vertical support 16*d* for facilitating sliding displacement of the eighth vertical support 18*d* within the fourth vertical support. Thus, end cap 42 is preferably in the form of a nylon disc attached to the lower end of the eighth vertical support 18*d* by means of a mounting screw or bolt 44. A second pin 47 such as a small screw or bolt is also inserted through the end cap 42 and into the lower end of the eighth vertical support 18*d* for preventing rotation of the end cap on the vertical support. Each of the other three vertical support combinations includes a similar annular bearing, collar and end cap arrangement to facilitate relative displacement between the attached vertical support members. Collar 62*d* is preferably removable and is attached to the upper end of the fourth vertical support 16*d* by conventional means such as a threaded coupling or a retaining pin, neither of which is shown in the figures for simplicity.

As previously described, the coiled spring in each locking mechanism urges the locking bars in a direction along the line of the elongated, linear rod to which the locking bars are attached. More specifically as described above, coiled spring 26 urges the first and second locking bars 30*a*, 30*b* in a generally leftward direction as viewed in FIG. 1, while coiled spring 54 urges the third and fourth locking bars 30*c*, 30*d* in a rightward direction as viewed in FIGS. 2 and 3. With reference specifically to FIGS. 2 and 3, when the vehicle support 10 is in the fold down position as shown in FIG. 2, the second and third locking bars 30*c*, 30*d* are positioned within one of the upper apertures within the third and fourth vertical supports 16*c* and 16*d*, respectively. In this configuration, the distal ends of the third and fourth locking bars 30*c* and 30*d* respectively engage outer lateral portions of the seventh and eighth vertical supports 18*c*, 18*d* disposed within the third and fourth vertical supports 16*c*, 16*d*, respectively. When the upper platform 14 is raised as described below, each of the locking bars positioned within a respective upper aperture of an outer vertical support engages the inner vertical support disposed within the outer vertical support until the lower end of the inner vertical support clears the aperture in the outer vertical support within which the locking bar is positioned. Once the lower end of the inner vertical support clears the aperture within which the locking bar is positioned, the coiled spring attached to the linear, elongated rod connected to the locking bar urges the rod and locking bar combination in a direction so that the locking bar is displaced through the outer vertical support and extends through the aligned apertures therein. This is shown in FIG. 3, where the combination of the upper platform 14 and the fifth through eighth vertical supports attached thereto has been raised so that the lower ends of each of the inner vertical supports clears the aperture within which a respective locking bar is inserted. This permits locking bars 30*c* and 30*d*, under the urging of coiled spring 54, to be inserted through each of the vertical supports 16*c*, 16*d* and extend through the aligned, opposed apertures in each of these vertical supports. This permits each locking bar to engage a lower end of a respective inner vertical support for supporting the upper platform 14 and a vehicle disposed thereon.

Figure 6:
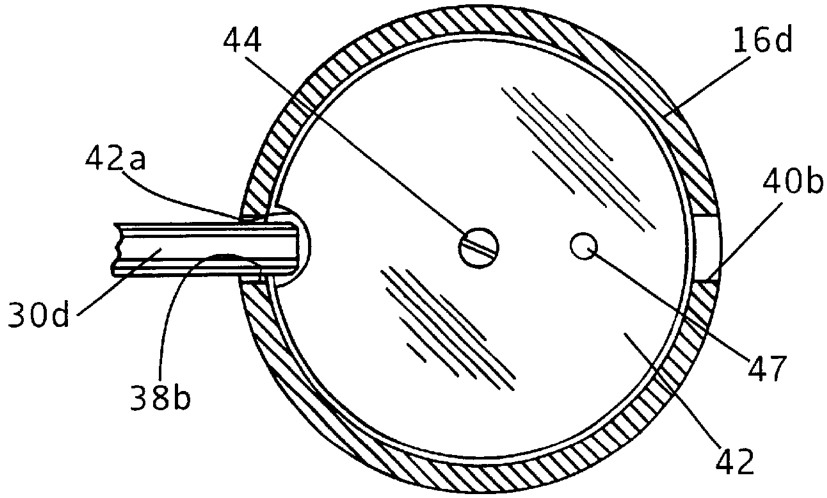
FIG. 6 is a transverse sectional view of a telescoping vertical support employed in the vehicle support of the present invention.

Referring to FIG. 6, there is shown a transverse sectional view of the lower end of the inner eighth vertical support 18*d* having an end cap 42 disposed thereon as positioned with the outer fourth vertical support 16*d*. The vertical support's end cap 42 is provided with a notched out, or recessed, portion 42*a* in a lateral surface thereof. As the combination of the upper platform and the four vertical supports attached thereto is raised as previously described, each of the locking bars will engage a lateral portion of a respective vertical support until the vertical support clears the locking bar in its upward travel. Thus, as shown in FIG. 6 the fourth locking bar 30*d* engages a lateral portion of the eighth vertical support 18*d* as it is displaced upward until the end cap 42 attached to the end of the eighth vertical support clears the locking bar. Once the combination of the eighth vertical support 18*d* and end cap 42 has been displaced upwardly so that the end cap clears locking bar 30*d*, the locking bar will be urged rightwardly as shown in FIG. 6 so that it extends through aligned apertures 38*b* and 40*b* within the fourth vertical support 16*d*. In this position, locking bar 30*d* provides support for the fourth vertical support 18*d* as well as the upper platform and a vehicle position on the upper platform.

Figure 7:
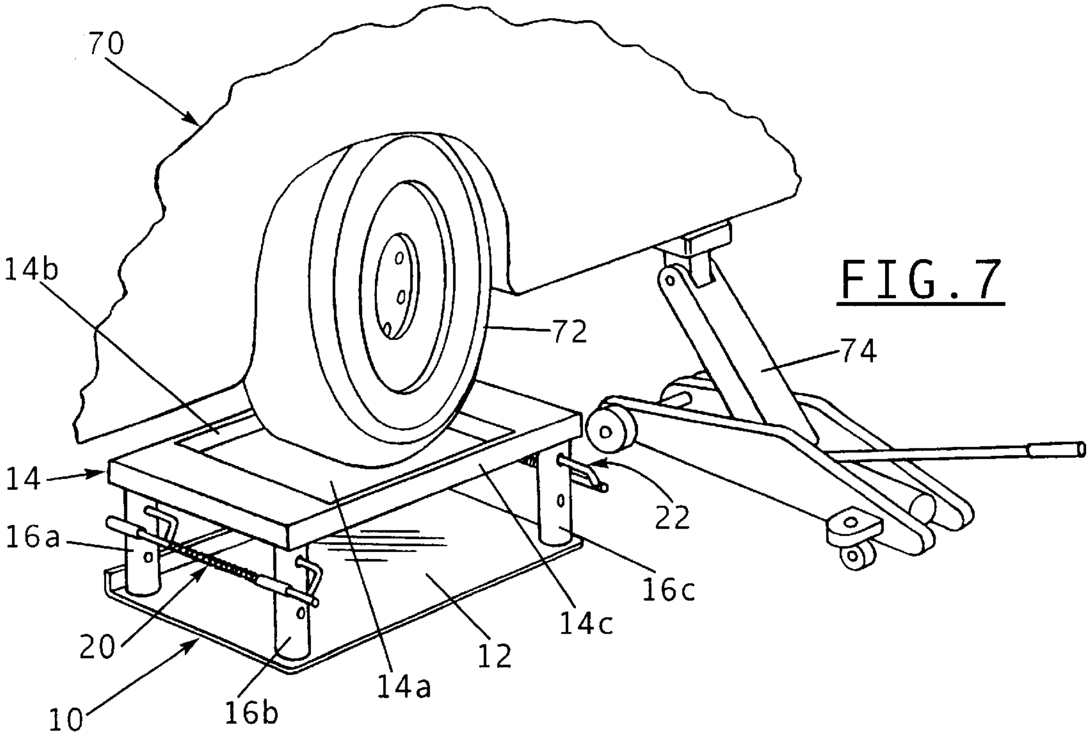
FIG. 7 is a perspective view showing the manner in which a jack is used to raise and position a wheel of a vehicle on the vehicle support of the present invention.
Figure 8:
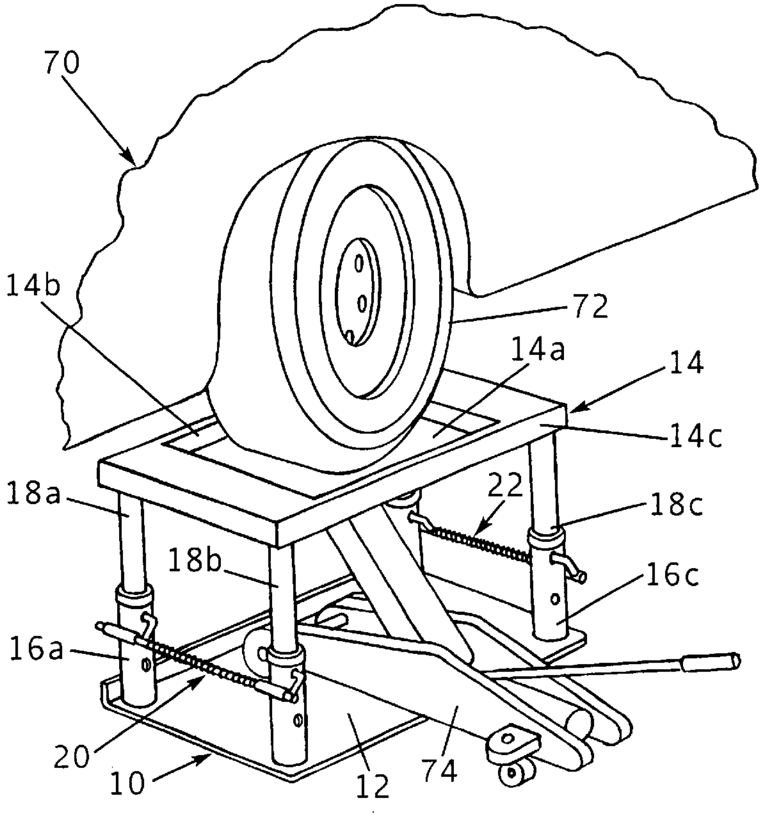
FIG. 8 is a perspective view illustrating the manner in which the vehicle support on which is disposed a wheel of a vehicle is raised by means of a jack for further elevating the vehicle in accordance with another aspect of the present invention.

Referring to FIGS. 7 and 8, the manner in which the vehicle support 10 of the present invention is used with a jack 74 is shown. The vehicle 70 is first elevated by jack 74 permitting the vehicle support 10 to be positioned beneath one of the vehicle's wheels 72.

The vehicle 70 is then lowered by the jack 74 so that the vehicle's wheel 72 is positioned within the recessed upper portion 14*a* of the vehicle support's upper platform 14. Jack 74 is then removed from the vehicle 70. In a preferred embodiment, jack 74 is a 1½–2 ton hydraulic jack. With the vehicle's wheel 72 positioned on the vehicle support's upper platform 14 as shown in FIG. 7, the jack 74 is then inserted in the vehicle support 10 so as to be disposed between the vehicle support's lower and upper platform 12, 14. Jack 74 is again raised causing the lifting of the vehicle support's upper platform 14 and the vehicle's wheel 72 disposed thereon. Once the fifth through eighth vertical supports 18*a*–8*d* each clears a respective locking bar in an associated one of the fifth through eighth vertical supports 16*a*–16*d*, the locking bars will be automatically inserted through aligned apertures in each of the fifth through eighth vertical supports so as to engage a lower end of and provide support for each of the fifth through eighth vertical supports and the upper platform 14 attached thereto as well as a vehicle 70 disposed on the upper platform. The vehicle 70 disposed on the fully upraised vehicle support 10 is shown in FIG. 8, where each of the four locking bars is shown inserted through an associated one of the first through fourth vertical supports

16*a*–16*d* so as to engage and provide support for an associated one of the fifth through eighth vertical supports 18*a*–18*d*. Jack 74 may then be removed, with the vehicle 70 securely and stably positioned on and supported by the vehicle support 10. In lowering vehicle 70, the procedure is reversed. Thus, jack 74 is placed beneath and in engagement with the upraised upper platform 14 to provide support for the vehicle 70 disposed thereon. The four locking bars 30*a*–30*d* are then removed from the four vertical support arrangements, and the jack 74 lowers the vehicle support's upper platform 14 and the vehicle 70 thereon to the position shown in FIG. 7. In this position, the vehicle support 10 is in the full down position, allowing the jack 74 to be removed. The jack 74 is then positioned in engagement with a lower portion of the vehicle 70 for raising the vehicle, allowing the vehicle support 10 to be removed and the vehicle to be lowered to the floor or ground.

Figure 9:
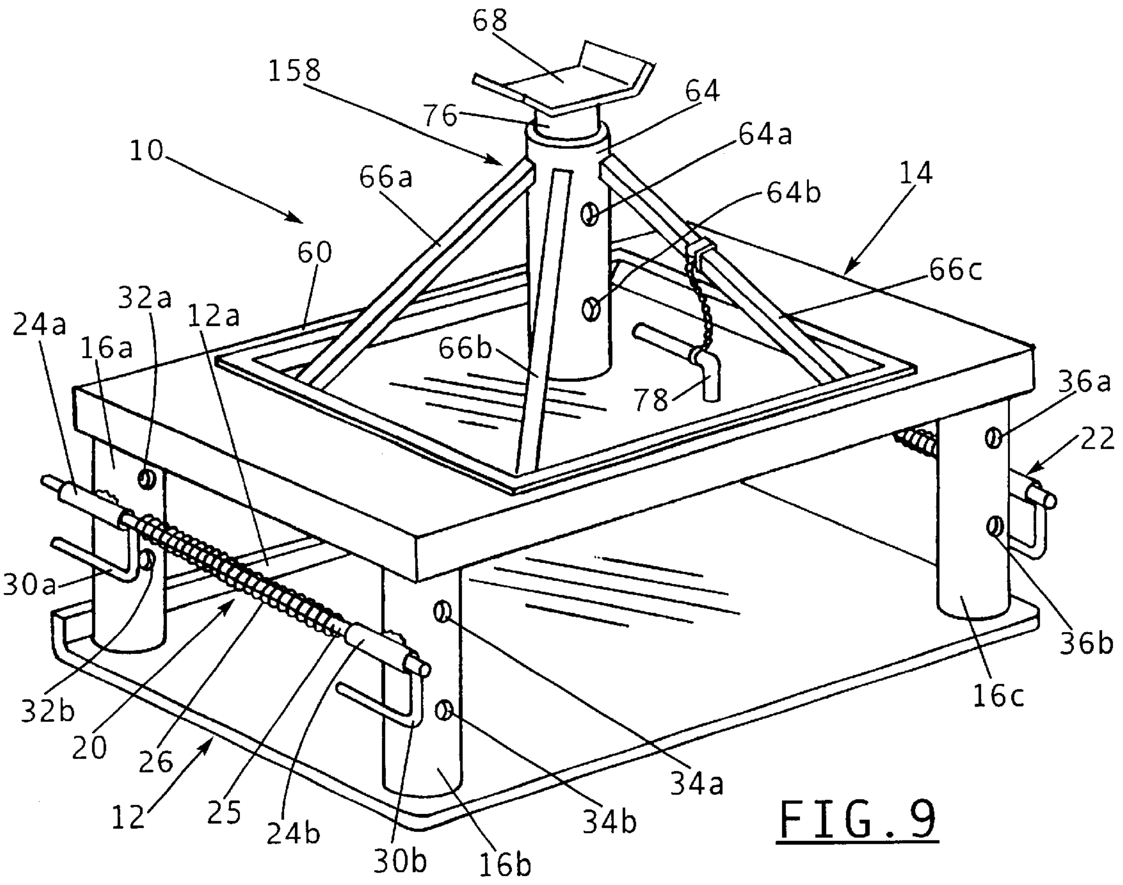
FIGS. 9, 10 and 11 are respectively upper perspective and side elevation views of an extension support for use with the vehicle support of the present invention.
Figure 10:
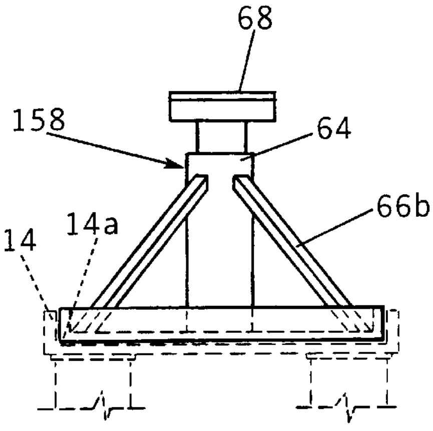
Figure 11:
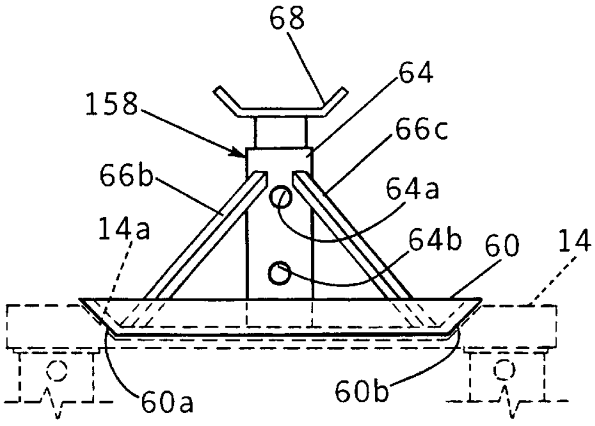

Referring to FIG. 9, there is shown in accordance with another aspect of the present invention an extension support 158 disposed on the vehicle support 10 for supporting a vehicle by engaging a structural component such as a frame member rather than the vehicle's wheel in supporting the vehicle in an elevated position. FIGS. 10 and 11 are side elevational views of the extension support 158 showing the manner in which the extension support is positioned within the recessed portion 14*a* in the upper surface of the vehicle support's upper platform 14. The extension support 158 also allows the vehicle to be supported at a greater height than by simply using the vehicle support 10. Extension support 158 includes a generally planar, rectangular, base member 60. Disposed on the upper surface of the base member and extending upwardly therefrom is a cylindrical member 64 having a pair of spaced apertures 64*a* and 64*b* disposed along its length. Inserted within and displaceable along the length of the base member 60 in a telescoping manner is a support member 76. Attached to the upper end of support member 76 is a cross member 68 which is adapted to engage and support a structural member in the vehicle's undercarriage which is not shown in the figures for simplicity. Disposed in a spaced manner along the length of the support member 76 are plural apertures (not shown in the figures for simplicity), which when aligned with the apertures 64*a* or 64*b* in the cylindrical member 64 allow a pin 78 to be inserted in the aligned apertures to maintain the cross member 68 and support member 76 combination in an extended, or upraised, position for supporting the vehicle at a greater height. Disposed about and attached to an upper portion of the cylindrical member 64 are four support legs, where only three support legs are shown in the figures as elements 66*a*, 66*b* and 66*c*. Each of the support legs is attached at its respective lower end to a peripheral portion of the extension support's base member 60 for increasing the strength of the extension support. As shown in the partial sectional side elevation views of FIGS. 10 and 11, the extension support's base member 60 is positioned within the recessed portion 14*a* in the upper surface of the upper platform 14 shown in FIG. 1. Respective lateral and front and back edges of the base member 60 are positioned in contact with adjacent portions of the upper platform's recessed portion 14*a*. As shown in FIG. 11, front and back edge portions 60*a* and 60*b* of the extension support's base member 60 are angled, or beveled, so as to intimately engage the adjacent angled portions of the upper platform's recessed portion 14*a*. The extension support 58 is thus fixedly and securely maintained in position in the upper platform's recessed portion 14*a*.

There has thus been shown a vehicle support for use with a jack for supporting a vehicle in an elevated position. The vehicle support includes lower and upper generally planar platforms arranged in a vertically spaced manner and connected by means of plural extendible support members. The vehicle is first raised by the jack and the vehicle support is positioned beneath one of the vehicle's wheels. The vehicle is then lowered by the jack unto the upper platform of the vehicle support and the jack is removed from the vehicle. The jack is then positioned between the vehicle support's lower and upper platforms to permit the upper platform to be raised to a second elevated position. The extendible support members are then locked in the extended position to maintain the vehicle support's upper platform and vehicle disposed thereon in an elevated position for maintenance or repair. Each of the extendible support members is disclosed as comprised of upper and lower vertical supports connected together in a telescoping manner. Locking bars are inserted in aligned apertures in a lower set of the vertical supports so as to engage and maintain in fixed position the upper vertical supports connected thereto. In the disclosed embodiment, a pair of locking bars are connected to an elongated common rod extending between adjacent vertical supports and urged to a first position by a coiled spring. In a first position, each of the locking bars is inserted through aligned apertures in a respective lower vertical support member so as to engage and provide support for an associated upper vertical support member and the upper platform. In lowering the vehicle, the locking bars are removed from the vertical supports allowing coupled pairs of vertical supports to be displaced in a telescoping manner relative to one another, permitting the jack to lower the upper platform to lowered position. The jack is then removed from the inventive vertical support, placed in contact with a lower portion of the vehicle for raising the vehicle to allow the vertical support to be removed, whereupon the vehicle is lowered to the floor or ground.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A multi-position vehicle support apparatus comprising:

a lower platform disposed on a support surface;

plural extendible support members attached to and extending upward from said lower platform in a generally vertical manner;

an upper platform disposed above said lower platform and attached to respective upper end portions of said plural extendible support members, said upper platform adapted to receive a wheel of a vehicle for supporting the vehicle in a first upraised position, said upper platform including a lower portion adapted to receive a jack for raising said upper platform and the wheel disposed thereon to a second, higher upraised position, wherein said upper platform includes a recessed portion on an upper surface thereof for receiving the vehicle's wheel and preventing vehicle movement;

locking means coupled to each of said plural extendible support members for locking said extendible support members in fixed relative position for supporting the vehicle at said second, higher upraised position; and a reinforcing structure coupling adjacent extendible support members.

2. The apparatus of claim 1 wherein said lower and upper platforms are generally planar and are aligned generally parallel to one another.

3. The apparatus of claim 2 wherein each of said lower and upper platforms includes a respective reinforcing flange extending the length thereof.

4. The apparatus of claim 1 wherein said reinforcing structure is disposed intermediate said lower and upper platforms and extends substantially the width of said platforms.

5. The apparatus of claim 1 wherein each of said extendible support members includes respective upper and lower telescoping members, with each of said lower telescoping members including first plural apertures arranged in a spaced manner along the length thereof, and wherein each of said first plural apertures is adapted to receive said locking means for fixedly connecting said upper and lower telescoping members.

6. The apparatus of claim 5 wherein said locking means include plural locking bars each adapted for insertion in an aperture in one of said lower telescoping members for engaging in upper telescoping member attached to the lower telescoping member for locking said upper and lower telescoping members in fixed relative position.

7. The apparatus of claim 6 wherein each lower telescoping member includes plural pairs of second aligned apertures arranged in a spaced manner along the length thereof, and wherein each pair of second aligned apertures is adapted to receive a respective locking bar.

8. The apparatus of claim 7 further comprising biasing means coupled to said locking bars for urging said locking bars to an inserted position within the aligned apertures in a respective lower telescoping member.

9. The apparatus of claim 8 wherein said biasing means includes a coiled spring.

10. The apparatus of claim 9 further comprising an elongated linear rod coupled to a pair of locking bars and further coupled to said coiled spring, with said linear rod urged by said coiled spring to a first position wherein each of said locking bars is inserted into a respective pair of aligned apertures in a lower telescoping member for locking said upper and lower telescoping members in fixed relative position.

11. The apparatus of claim 10 further comprising first bearing means disposed intermediate said lower and upper telescoping members for facilitating relative displacement therebetween.

12. The apparatus of claim 11 wherein said lower and upper telescoping members are generally cylindrical and said first bearing means is generally annular in shape.

13. The apparatus of claim 12 wherein said first bearing means is a ball bearing or nylon bearing.

14. The apparatus of claim 13 further comprising second bearing means disposed on a lower end of each of said upper telescoping members and engaging a lower telescoping member for further facilitating relative displacement between lower and upper telescoping members.

15. The apparatus of claim 14 wherein each upper telescoping member is disposed within a respective lower telescoping member and said second bearing means is in the shape of a disc.

16. The apparatus of claim 15 further comprising plural cylindrical collars each disposed on a respective upper end of a lower telescoping member for maintaining a respective annular-shaped ball bearing or nylon bearing in position in a respective lower telescoping member.

17. The apparatus of claim 1 further comprising an extension device disposed on an upper surface of said upper platform for engaging a structural member of the vehicle for supporting the vehicle in an upraised position.

18. The apparatus of claim 17 wherein said extension device is adapted for positioning within said recessed portion for preventing displacement of said extension device.

19. The apparatus of claim 18 wherein said extension device includes a base adapted for positioning in the recessed portion of said upper platform and an upright support disposed on said base and engaging a structural member of the vehicle.

20. The apparatus of claim 19 wherein said upright support is adjustable in height.

* * * * *